(No Model.)

J. & E. E. KOONS.
THRASHING MACHINE.

No. 260,691. Patented July 4, 1882.

Attest,
Sidney P. Hollingsworth
Walter S. Dodge

Inventors:
Joseph Koons,
Elmer E. Koons,
by Dodge & Son,
Attys.

(No Model.)

J. & E. E. KOONS.
THRASHING MACHINE.

No. 260,691.

4 Sheets—Sheet 3.

Patented July 4, 1882.

Attest.
Sidney P. Hollingworth
Walter S. Dodge.

Inventors:
Joseph Koons,
Elmer E. Koons,
by Dodge & Son,
Attys.

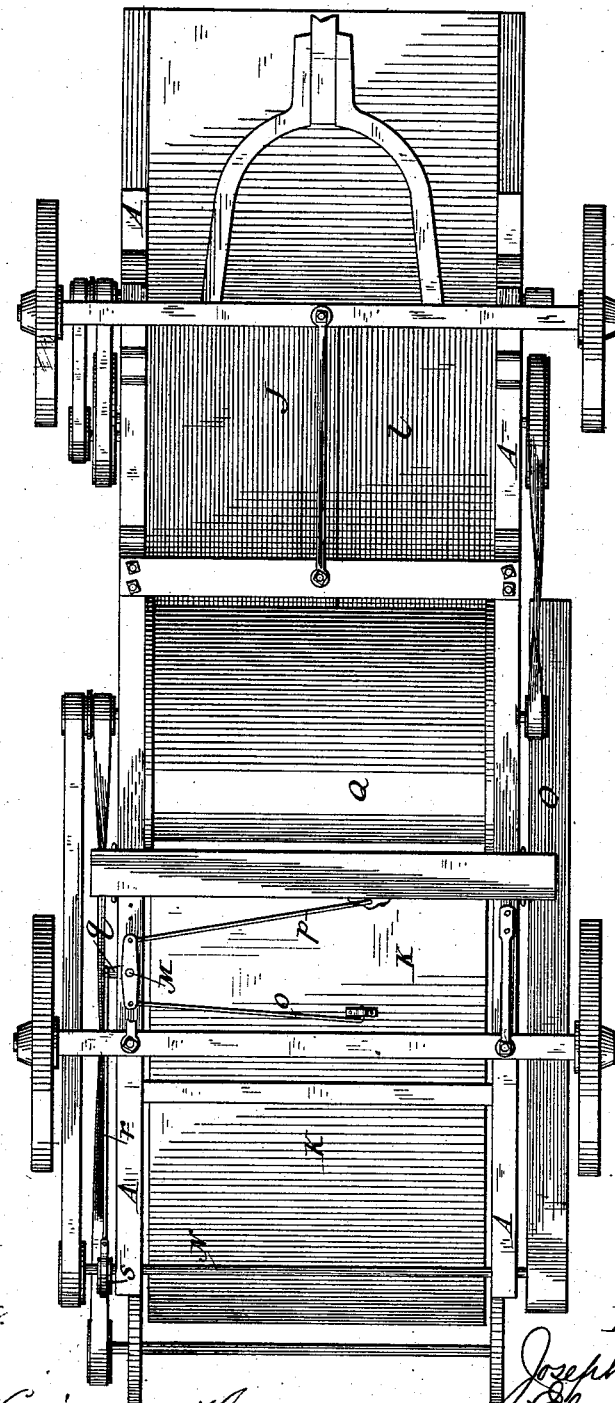

UNITED STATES PATENT OFFICE.

JOSEPH KOONS AND ELMER E. KOONS, OF NEW AUBURN, MINNESOTA.

THRASHING-MACHINE.

SPECIFICATION forming part of Letters Patent No. 260,691, dated July 4, 1882.

Application filed August 16, 1881. (No model.)

*To all whom it may concern:*

Be it known that we, JOSEPH KOONS and ELMER E. KOONS, of New Auburn, in the county of Sibley and State of Minnesota, have invented certain Improvements in Thrashing-Machines, of which the following is a specification.

Our invention relates to thrashing-machines; and it consists in various features and details of construction hereinafter described.

Figure 1:
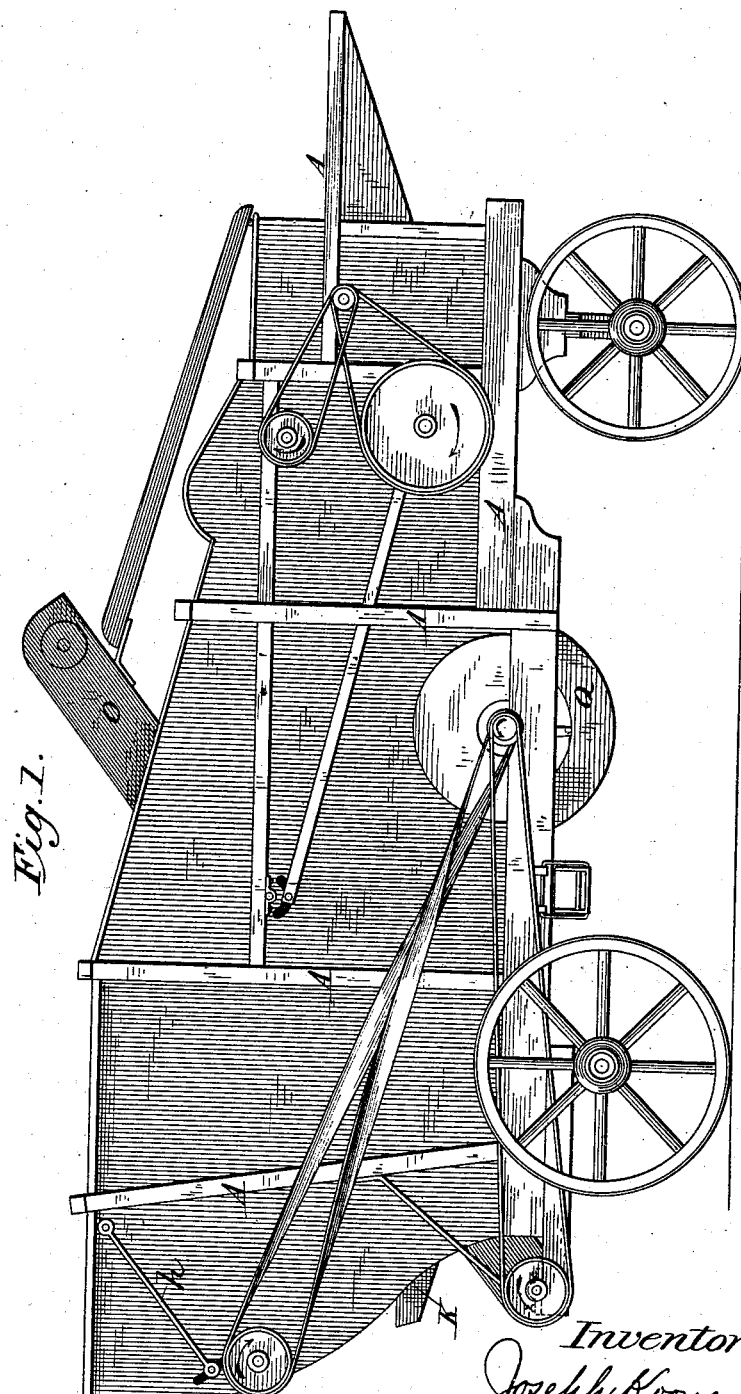
Figure 2:
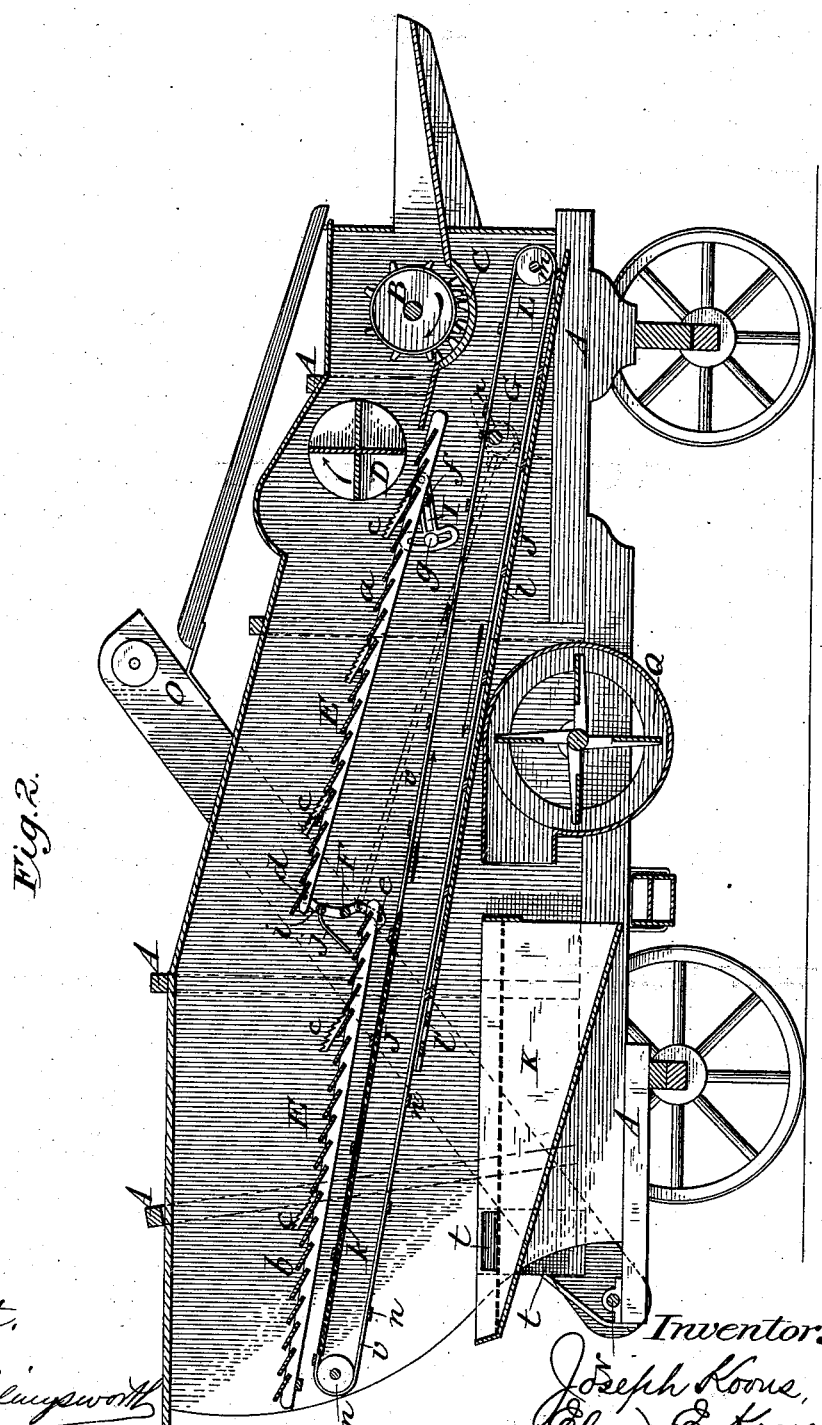
Figure 3:
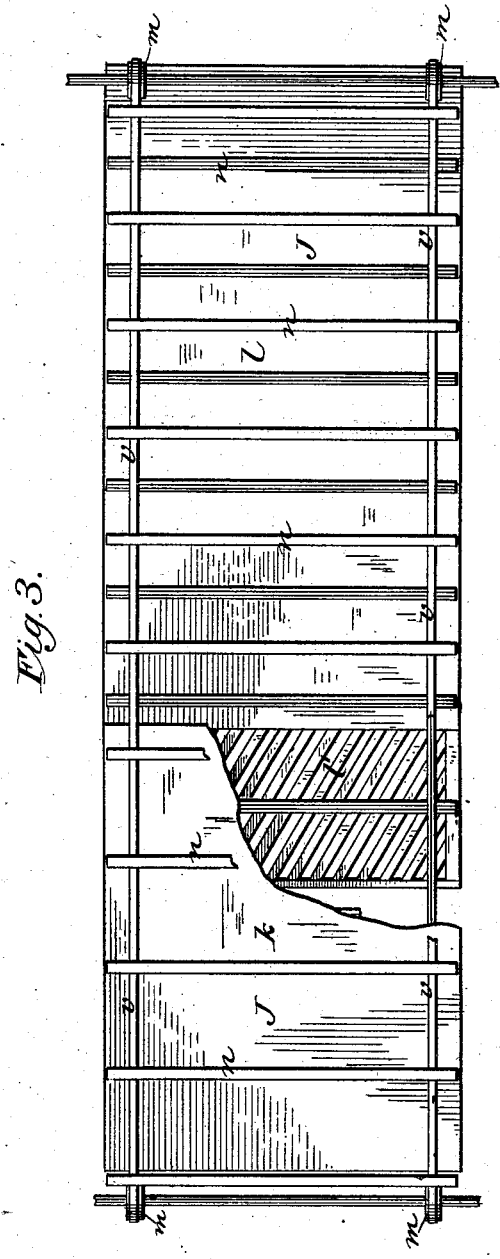

In the accompanying drawings, Figure 1 represents a side elevation of our improved machine; Fig. 2, a longitudinal vertical section of the same; Fig. 3, a plan view of the grain-tables and rake or conveyer, the upper table being partially broken away to show the diagonal opening of the lower bed or table; and Fig. 4, a bottom plan view of the machine.

The object of our invention is to improve the separating and cleaning capacity of the machine, to render its construction cheap and simple, and to enable it to be driven by a light power. With these ends in view we construct the frame-work A in the same general manner as in machines now in use, and mount therein the usual thrashing-cylinder and concave, B and C, from which the straw passes beneath the rotary beater D to a conveying and separating bed or platform, E, which constitutes a leading feature of our invention. This bed or platform is composed of two sections, $a$ and $b$, one extending from the concave about one-half the length of the machine rearward, and slightly overlapping the forward end of the second section, which latter extends thence to the rear end of the machine. The sections $a\,b$ are preferably slatted, as shown in Fig. 2, the slats slightly overlapping one another, and openings being left between them at the rear, as shown; and in order the better to take hold of and advance the straw the sections are provided with upwardly-projecting fingers $c$, notched or barbed, as shown.

The proximate ends of the two sections $a$ and $b$ are connected with cross-heads or shafts $d$ and $e$, carried respectively by the upper and lower arms of a rock-shaft, F, to which motion is imparted from an eccentric, G, by a pitman.

The forward end of the section $a$ is provided with a cross-bar, $f$, the ends of which are carried by flanged plates I, pivoted at their forward ends to the sides of the casing or body of the machine, and slotted concentrically with their pivots to permit them to be adjusted and to be locked at any desired angle by bolts $g$ to give the front end of the section $a$ the desired line of movement.

The rear end of section $b$ of the carrier is suspended by links or spring-arms $h$, preferably located on the outside of the machine, the cross bar or rod which sustains the end of the section being extended through slots in the casing and connected with said links or arms, as shown. By changing the position of the pivots of the links or fixed ends of the spring-arms $h$ the direction of movement of the rear ends of section $b$ may be varied. The sections $a\,b$, being on opposite sides of the rock-shaft and moving in reverse directions, serve to counterbalance each other and render the action of the machine steady. Under this arrangement it will be seen that upon the turning of the rock-shaft in opposite directions the sections $a\,b$ will be caused alternately to advance toward and to recede from each other.

The section $a$ receiving straw from the cylinder and concave carries it forward, the quick movements of the rock-shaft causing the sections to move back beneath the straw, which, being caught by the slats and barbed fingers of the sections, is carried forward therewith. Arriving at the rear end of section $a$, the straw passes to the section $b$, and, owing to the difference in elevation of the two and the movement of each from the other, a very perfect separation of the straw is effected. In order, however, to render the separation more complete and certain, the upper arms carry a fixed cross-bar, $i$, provided with a series of fingers, $j$, which rest normally upon the forward end of section $b$ of the carrier E, but which rise therefrom as the sections move apart, by reason of the tipping of the rock-shaft and the change of inclination of its arms. The fingers, being thus caused to rise as the sections $a\,b$ move apart, lift the straw and render the separation complete.

Beneath the carrier E is arranged a grain table or platform, J, consisting of two sections, $k$ and $l$, the former located directly under the section $b$ of the straw carrier or bed, and the latter located below the section $a$ and extending rearward beneath the section $k$ of the grain-table some distance, and directly over the shaking-shoe K. The portion $l'$, which projects over the shoe, is slotted or provided with diagonal openings, as shown in Fig. 3.

L represents an endless grain rake or carrier, consisting of narrow belts $v$, passing around pulleys $m$ at opposite ends of the machine, and carrying transverse slats $n$, the pulleys being so located that the rake shall pass over the upper face of section $k$ of the grain-table, thence around the pulleys $m$, and over the face of section $l$ of said grain-table. The grain falling through the straw-carrier E is received upon the sections $k$ $l$ of the grain-table J. The rake L traveling over section $k$ sweeps the grain therefrom to section $l$, whence it is swept, together with the other grain thereon, over the diagonally slotted or perforated portion $l'$ of the same, and caused to fall through the openings into the shoe K. The diagonal openings cause the grain as it is brought forward by the transverse slats of the rake to be separated into small streams and to fall in a sifting manner over the whole or a large portion of the surface of the screens, instead of falling in mass at one point and clogging the screen. This feature renders the action of the screens far more perfect and satisfactory than where the grain is delivered at one end of the screen, and caused to travel over the entire surface of the same to the opposite end.

In order to give the desired motion to the shoe and the grain-spout into which said shoe delivers, the shoe and spout are connected by rods $o$ $p$ to the arms of a vertical rock-shaft, M, having an arm, $q$, connected by a rod or pitman, $r$, with an eccentric, $s$, secured upon a shaft, N, extending transversely across the rear end of the machine. By this arrangement the shoe and the grain-spout are simultaneously moved in opposite directions, and thus an efficient action of the screens and a proper delivery of the grain from the spout are secured, and each is caused in a measure to counteract the jarring or shaking motion of the other, thus rendering the motion easy and regular. At its opposite end the shaft N carries a pulley, around which the belt of an endless elevator, O, passes, and from which said conveyer receives motion. The grain passing through the screens or sieves of the shoe K is delivered into the grain-spout at the bottom thereof, while the tailings, consisting of chaff, straw, and foreign matters, together with more or less grain, are delivered into trough $t$, whence they pass to the elevator O, by which they may be discharged from the machine or redelivered to the shoe and subjected to a second cleaning operation.

Motion is imparted to the various parts of the machine from the shaft P, upon which the eccentrics G are mounted, by suitable belts or gearing, said shaft being driven by belt from the cylinder-shaft.

The rotary beater D is formed with radial blades, and serves both to direct and advance the straw and to fan out the light particles.

A fan, Q, located beneath the grain-table, as usual, acts in conjunction with the shaking-shoe to clean the grain.

Having thus described our invention, what we claim is—

1. In combination with a straw carrier or platform, carried at one end by a rock-shaft, flanged supporting and guiding plates T, pivoted at one end and slotted at the other, whereby they may be adjusted to vary the line of movement of one end of the platform without altering the movement of the other end.

2. In combination with the sections $a$ $b$ of the straw-carrier, connected with an intermediate rock-shaft, as shown and described, a separator consisting of a series of fingers projecting from a cross-bar carried by the arms of the rock-shaft, as set forth.

3. In combination with the sections $a$ $b$ of the straw-carrier, arranged end to end and having their proximate ends carried by an intermediate rock-shaft, a vibrating separator, substantially such as described, located between the sections and adapted to rise as they move apart, whereby a perfect separation of the stream of straw is effected.

4. In combination with a screen or screens, a grain-table provided with openings arranged diagonally across its face, and a raking device adapted and arranged to move in a straight line over the openings, whereby the grain is delivered gradually through them.

JOSEPH KOONS.
ELMER E. KOONS.

Witnesses:
EDWARD RAMSDELL,
CHARLES P. GARDNER.